US009228841B2

(12) United States Patent
Dutta et al.

(10) Patent No.: US 9,228,841 B2
(45) Date of Patent: Jan. 5, 2016

(54) METHODS AND SYSTEMS FOR DETERMINING ROUTES IN A NAVIGATION SYSTEM

(71) Applicant: Xerox Corporation, Norwalk, CT (US)

(72) Inventors: Partha Dutta, Bangalore (IN); Abhishek Tripathi, Bangalore (IN); Koustuv Dasgupta, Bangalore (IN); Nischal Murthy Piratla, Fremont, CA (US)

(73) Assignee: Xerox Corporation, Norwalk, CT (US)

( * ) Notice: Subject to any disclaimer, the term of this patent is extended or adjusted under 35 U.S.C. 154(b) by 17 days.

(21) Appl. No.: 14/293,172

(22) Filed: Jun. 2, 2014

(65) Prior Publication Data

US 2015/0345951 A1    Dec. 3, 2015

(51) Int. Cl.
*G01C 21/00* (2006.01)
*G01C 21/34* (2006.01)
*G01C 21/36* (2006.01)

(52) U.S. Cl.
CPC ............... *G01C 21/00* (2013.01); *G01C 21/34* (2013.01); *G01C 21/3605* (2013.01)

(58) Field of Classification Search
CPC .. G01C 21/00; G01C 21/343; G01C 21/3605; G01C 21/3617
USPC ........ 701/400, 410, 36, 423, 533; 340/995.13
See application file for complete search history.

(56) References Cited

U.S. PATENT DOCUMENTS

| 5,948,040 A | 9/1999 | DeLorme et al. |
|---|---|---|
| 7,080,019 B1 | 7/2006 | Hurzeler |
| 7,124,118 B2 | 10/2006 | Andrews |
| 7,908,080 B2* | 3/2011 | Rowley et al. ................ 701/423 |
| 8,768,625 B2* | 7/2014 | Kritt et al. ..................... 701/533 |
| 2009/0234658 A1 | 9/2009 | Greenwell et al. |
| 2011/0112759 A1 | 5/2011 | Bast et al. |
| 2011/0112762 A1* | 5/2011 | Gruijters et al. .............. 701/208 |
| 2011/0208551 A1 | 8/2011 | Johnson |
| 2012/0253657 A1 | 10/2012 | Francis |
| 2013/0080055 A1 | 3/2013 | Speier et al. |

OTHER PUBLICATIONS

M. Horn, "Procedures for planning multi-leg journeys with fixed-route and demand-responsive passenger transport services," *Transportation Research Part C*, pp. 33-55, 2004.

* cited by examiner

*Primary Examiner* — Gertrude Arthur Jeanglaude

(57) ABSTRACT

Methods and systems for determining one or more routes in a navigation system. A request comprising a first set of parameters corresponding to a trip is received. The first set of parameters comprise at least one an originating node for the trip, a destination node for the trip, a start time for the trip, or a set of preferences associated with the trip. The one or more routes between the originating node and the destination node are determined based on the first set of parameters. Each of the one or more routes comprises at least one public transportation sub-trip traversed by a public vehicle and a private transportation sub-trip traversed by a private vehicle. The one or more routes are ranked based on a trip score associated with the one or more routes. The trip score is determined based on the set of preferences.

23 Claims, 8 Drawing Sheets

METHODS AND SYSTEMS FOR DETERMINING ROUTES IN A NAVIGATION SYSTEM

TECHNICAL FIELD

The presently disclosed embodiments are related, in general, to a navigation system. More particularly, the presently disclosed embodiments are related to methods and systems for determining routes in the navigation system.

BACKGROUND

Navigation systems may facilitate users to plan a trip between different geographic locations. Various public and private transportation authorities may utilize different navigation systems to facilitate their users to plan the trip. A user may plan a trip using public transportation modes (e.g., buses, trains, trams, metros) or private transportation modes (e.g., taxis, pooled cars, hired bicycles). Typically, a user may provide a number of input parameters, such as an originating node, a destination node, timing details, and the like, while planning the trip between the originating node and the destination node. The navigation system may provide the user various options to traverse the journey between the originating node and the destination node.

However, with the economic growth, catering to the transportation requirements through public transportation infrastructure, alone, may be difficult. Continuous expansion of the public transportation infrastructure to meet the increasing demand is not feasible considering cost and space constraints. In addition, limited reach and timing constraints associated with the public transportation systems have led to increasing need of private transportation systems. However, the private transportations systems also have their limitations, such as increased costs, parking issues, increase carbon emission, etc. In addition, private transportation systems, generally, have low acceptance by the users in terms of sharing their cars for ridesharing purposes.

SUMMARY

According to embodiments illustrated herein, there is provided a method for determining one or more routes in a navigation system. The method includes receiving a request comprising a first set of parameters corresponding to a trip. The first set of parameters comprises at least one of an originating node for the trip, a destination node for the trip, a start time for the trip, or a set of preferences associated with the trip. The set of preferences comprises at least one of ridesharing constraints, tolerance constraints, and route constraints. The method further includes determining the one or more routes between the originating node and the destination node, based on the first set of parameters. Each of the one or more routes comprises at least one public transportation sub-trip traversed by a public vehicle and a private transportation sub-trip traversed by a private vehicle. The method further includes ranking the one or more routes based on a trip score, associated with each of the one or more routes, determined based on the set of preferences. The method is performed by one or more processors.

According to embodiments illustrated herein, there is provided a method for determining one or more routes in a navigation system. The method includes receiving a request comprising a first set of parameters corresponding to a trip. The first set of parameters comprises at least one of an originating node for the trip, a destination node for the trip, a start time for the trip, or a set of preferences associated with the trip. The method further includes determining the one or more routes between the originating node and the destination node, based on the first set of parameters. Each of the one or more routes comprises at least one public transportation sub-trip and a private transportation sub-trip. The method for determining the one or more routes includes determining a plurality of intermediate nodes between the originating node and the destination node. The originating node, the destination node, and the plurality of intermediate nodes constitute a set of nodes. The method for determining the one or more routes further includes determining the private transportation sub-trip between a first node, from the set of nodes, and a second node, from the set of nodes. The second node has greater distance from the originating node than the first node. The private transportation sub-trip between the first node and the second node is traversed by a private vehicle. The method for determining the one or more routes further includes determining the at least one public transportation sub-trip comprising the first node and the second node. The at least one public transportation sub-trip is traversed by a public vehicle. The method is performed by one or more processors.

According to embodiments illustrated herein, there is provided a system for determining one or more routes in a navigation system. The system includes one or more processors operable to receive a request comprising a first set of parameters corresponding to a trip. The first set of parameters comprises at least one of an originating node for the trip, a destination node for the trip, a start time for the trip, or a set of preferences associated with the trip. The set of preferences comprises at least one of ridesharing constraints, tolerance constraints, and route constraints. The one or more processors are further operable to determine the one or more routes between the originating node and the destination node, based on the first set of parameters. Each of the one or more routes comprises at least one public transportation sub-trip traversed by a public vehicle and a private transportation sub-trip traversed by a private vehicle. The one or more processors are further operable to rank the one or more routes based on a trip score, associated with each of the one or more routes, determined based on the set of preferences.

According to embodiments illustrated herein, there is provided a computer program product for use with a computer. The computer program product includes a non-transitory computer readable medium. The non-transitory computer readable medium stores a computer program code for determining one or more routes in a navigation system. The computer program code is executable by one or more processors to receive a request comprising a first set of parameters corresponding to a trip. The first set of parameters comprises at least one of an originating node for the trip, a destination node for the trip, a start time for the trip, or a set of preferences associated with the trip. The set of preferences comprises at least one of ridesharing constraints, tolerance constraints, and route constraints. The computer program code is further executable by the one or more processors to determine the one or more routes between the originating node and the destination node, based on the first set of parameters. Each of the one or more routes comprises at least one public transportation sub-trip traversed by a public vehicle and a private transportation sub-trip traversed by a private vehicle. The computer program code is further executable by the one or more processors to rank the one or more routes based on a trip score, associated with each of the one or more routes, determined based on the set of preferences

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
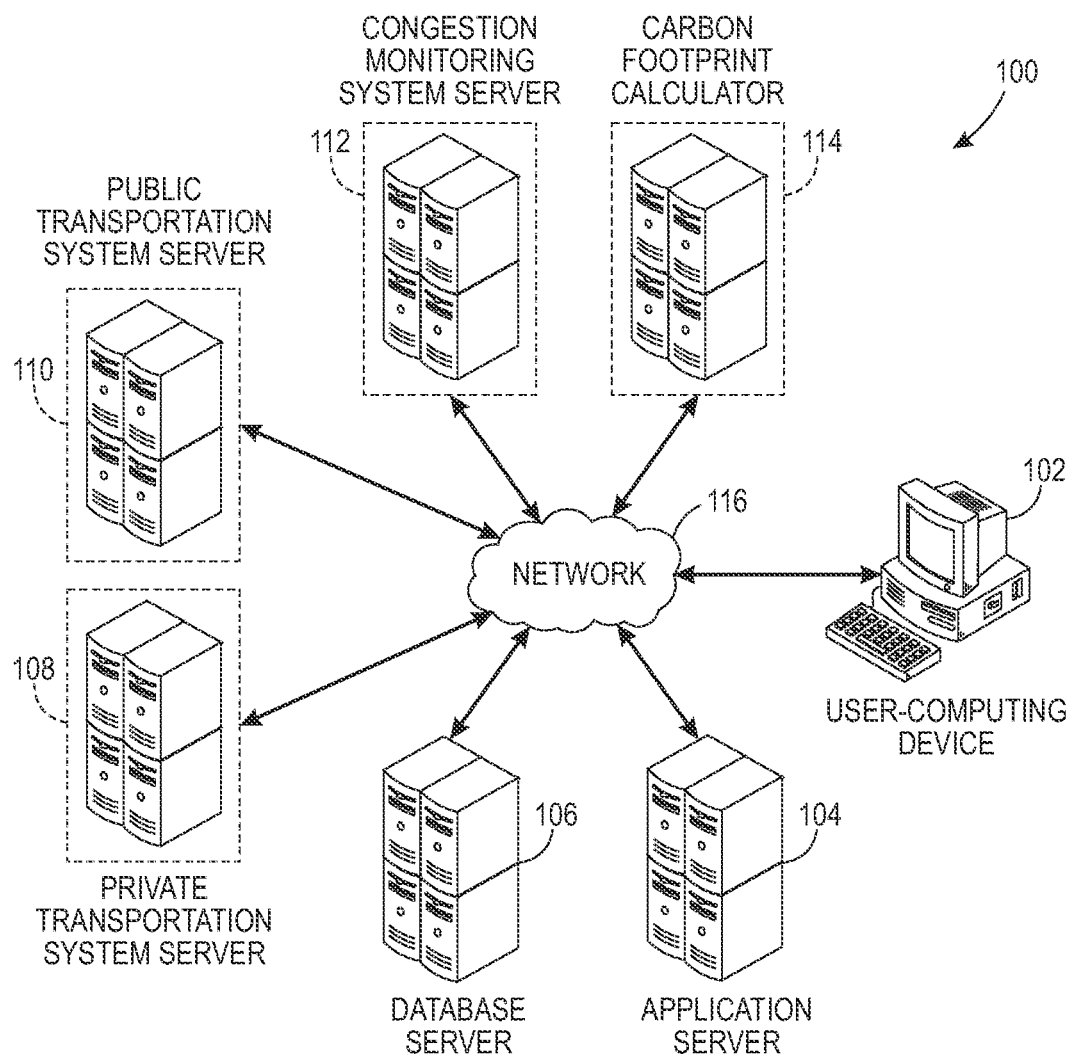
FIG. 1 is a block diagram illustrating a system environment in which various embodiments may be implemented.

The present disclosure is best understood with reference to the detailed figures and descriptions set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "navigation system" refers to a framework/tool/application/software that may be utilized for planning a trip between two geographical locations. The trip between the two geographical locations may be traversed through one or more routes. In an embodiment, the navigation system may provide a user various options to traverse the one or more routes, based on the inputs provided by the user. In an embodiment, the navigation system may determine the one or more routes, such that each route, from the one or more routes, includes a private transportation sub-trip and at least one public transportation sub-trip. Thus, the combination of the private transportation sub-trip and the at least one public transportation sub-trip completes the trip between the two geographical locations.

A "private transportation sub-trip" corresponds to a part of the route, determined by the navigation system, which is traversed by a private vehicle. Examples of the private vehicles may include a personal car, a pooled car, a hired taxi, a hired bicycle, and the like.

A "public transportation sub-trip" corresponds to a part of the route, determined by the navigation system, which is traversed by a public vehicle. Examples of the public vehicles may include buses, trains, metro, trams, and the like.

"A first set of parameters" refers to one or more parameters provided by the user, who wants to plan the trip. In an embodiment, the first set of parameters may include parameters, such as, but not limited to, an originating node (i.e., the geographical location from where the user wants to start the trip), a destination node (i.e., the geographical location where the user wants to end the trip), a start time (i.e., a time when the trip is planned to be started), and a set of preferences.

"A set of preferences" refers to one or more preferences selected by the user, while planning the trip. In an embodiment, the user may provide different types of preferences, such as ridesharing constraints, tolerance constraints, and route constraints. The user may select the one or more preferences, using a traveler portal accessed through a computing device associated with the user.

"Ridesharing constraints" refer to the preferences, selected by the user, that are related to preferences for the co-passengers and the private vehicle type. For example, the ridesharing constraints may refer to at least one of a make of the private vehicle, maximum occupancy level of the private vehicle, maximum number of co-passengers in the private vehicle, acquaintance with the co-passengers, maximum deviation of distance from shortest distance between the originating node and the destination node, or maximum deviation of time from the start time for the trip.

"Tolerance constraints", selected by the user, may include at least one of a relevancy level of carbon-footprint on the trip, a relevancy level of cost for the trip, and a relevancy level of duration of the trip. That is, through the tolerance constraints, the user may specify weights to be assigned to different factors (e.g., carbon-footprint, cost, duration, etc.). In addition, the tolerance constraints may include at least one of maximum number of hops in the trip, maximum deviation of distance from the originating node, maximum deviation of distance from the destination node, maximum distance of walking sub-trips, or maximum waiting time in the trip. That is, the user may also provide various thresholds (e.g., related to number of hops, deviation, etc.) through the tolerance constraints.

"Route constraints" may refer to preferences, selected by the user, that are related to constraints in the routes between the originating node and the destination node. For example, the route constraints may include at least one of inclusion of a node in the trip, exclusion of a node in the trip, inclusion of a route in the trip, exclusion of a route in the trip, travel mode of the trip, or a preferred time for the trip.

A "trip score" may refer to a numerical value assigned to each of the one or more routes, determined by the navigation system. In an embodiment, the navigation system may determine the trip score based on the set of preferences selected by the user. Further, in an embodiment, the navigation system ranks the one or more routes based on the determined trip score.

FIG. 1 is a block diagram illustrating a system environment 100 in which various embodiments can be implemented. The system environment 100 includes a user-computing device 102, an application server 104, a database server 106, a private transportation system server 108, a public transportation system server 110, a congestion monitoring system server 112, a carbon footprint calculator 114, and a network 116. In an embodiment, various devices of the system environment 100 (e.g., the user-computing device 102, the application server 104, the database server 106, the private transportation system server 108, the public transportation system server 110, the congestion monitoring system server 112, and the carbon footprint calculator 114) may be interconnected over the network 116.

The user-computing device 102 refers to a computing device, used by a user, who wants to plan a trip between an originating node and a destination node. In an embodiment, the user may provide a first set of parameters through a traveler's portal installed on the user-computing device 102. In an embodiment, the traveler's portal is received by the user-computing device 102 from the application server 104. The user may provide the first set of parameters, as an input to the traveler's portal, using an input device (such as, keyboard, mouse, touch-interface, joystick) associated with the user-computing device 102. In an alternate embodiment, using the user-computing device 102, the user may provide the first set of parameters on a user interface on the application server 104 that may be accessed through a web interface. The user-computing device 102 may receive one or more routes, determined by the application server 104, on a display device associated with the user-computing device 102. The user-computing device 102 may include a variety of computing devices, such as a desktop, a laptop, a personal digital assistant (PDA), a tablet computer, and the like.

The application server 104 refers to a computing device that determines the one or more routes based on the first set of parameters received from the user through the user-computing device 102. In an embodiment, the application server 104 receives the first set of parameters from the traveler's portal installed on the user-computing device 102. In an alternate embodiment, the application server 104 receives the first set of parameters through the user interface presented to the user through the web-interface. Based on the first set of parameters, the application server 104 may determine the one or more routes. In an embodiment, the application server 104 may access at least one of the private transportation system server 108, the public transportation system server 110, the congestion monitoring system server 112, or the carbon footprint calculator 114 to determine the one or more routes. In an alternate embodiment, the application server 104 may access the database server 106 to receive information pertaining to the private transportation system or the public transportation system. The determined one or more routes may include a private transportation sub-trip and at least one public transportation sub-trip. In an embodiment, the application server 104 may determine a trip score corresponding to each route, from the one or more routes. Subsequently, based on the trip score, the application server 104 may rank the one or more routes and present the ranked one or more routes on the display device associated with the user-computing device 102. In an embodiment, the application server 104 may receive a selection of a route, from the one or more presented routes, from the user. Thereafter, the application server 104 may determine a booking status of the private transportation sub-trip included in the selected route. The application server 104 may confirm the user about the booking status and, accordingly, may prompt the user to select an alternative route. Further details about the determination of the one or more routes and subsequent steps have been discussed in conjunction with FIG. 4. The application server 104 may be realized through various types of servers such as, but not limited to, Java server, .NET framework, and Base4 server.

The database server 106 refers to a computing device that stores a transportation database. In an embodiment, the transportation database includes information pertaining to the public transportation system and/or the private transportation system. In an embodiment, the database server 106 may receive such information from the private transportation system server 108 and the public transportation system server 110. In an embodiment, the transportation database may include information pertaining to the walking time between different nodes. In an embodiment, the transportation database may store a map database that includes information pertaining to various nodes (i.e., geographical locations) that are interconnected by different routes. Further, in an embodiment, the transportation database may store the information pertaining to the carbon-emission levels or congestions levels at different nodes. For such information, the database server 106 may query the congestion monitoring system server 112, and the carbon footprint calculator 114. In an embodiment, the database server 106 receives a query from the application server 104 to extract the information pertaining to at least one of the public transportation system, the private transportation system, carbon emission levels, congestion levels, or map database. The database server 106 may receive a query from the application server 104 to retrieve such information, using one or more querying languages such as, but not limited to, SQL, QUEL, DMX, and so forth. The database server 106 may be realized through various technologies, such as, but not limited to, Microsoft® SQL server, Oracle®, and My SQL®. In an embodiment, various nodes (e.g., the application server 104, the private transportation system server 108, the public transportation system server 110, etc.) may be connected to the database server 106 using one or more protocols such as, but not limited to, ODBC protocol and JDBC protocol.

In an embodiment, database server 106 may be updated. For example, the database server 106 may transmit an HTTP request to at least one of the private transportation system server 108 or the public transportation system server 110 to receive the latest information pertaining to the private transportation system and the public transportation system. The database server 106 may receive the latest information pertaining to paths followed by the public/private vehicles, vehicle ids of the public/private vehicles, real-time location of the public/private vehicles, public/private vehicle's availability and the like. In an alternate embodiment, the database server 106 may by updated through the RSS feeds. In an alternate embodiment, at least one of the private transportation system server 108 or the public transportation system server 110 may run one or more application programmable interfaces (APIs) to provide the latest information pertaining to the public transportation system and the private transportation system to the database server 106. For example, the private transportation system server 108 may execute the APIs to provide the information in the format of a text file, in which different fields may correspond to different types of information. For example, first line may correspond to current location of the private vehicle (e.g., through the GPS coordinates), second line may correspond to the private vehicle's availability, and the like. In a similar way other types of the information pertaining to the public transportation system and the private transportation system, as disclosed above, may be retrieved by the database server 106. In an embodiment, the database server 106 may be updated with latest information pertaining to the congestion levels and the carbon emission levels at different nodes at various time intervals of the day. In such a scenario, the database server 106 may query the congestion monitoring system server 112 or the carbon footprint calculator 114 to provide the latest information about the congestion levels and the carbon emission levels, respectively.

It will be apparent to a person having ordinary skill in the art that the functionalities of the database server 106 may be integrated with the application server 104, without departing from the scope of the disclosure. In such a scenario, the application server 104 may query at least one of the private transportation system server 108, the public transportation system server 110, the congestion monitoring system server 112, or the carbon footprint calculator 114 to retrieve the latest information pertaining to respective servers.

The private transportation system server 108 refers to a computing device associated with the private transportation system. In an embodiment, the private transportation system server 108 includes information pertaining to the private transportation system, such as, but not limited to, the private vehicle's id, contact details of the private vehicle's owner, available capacity in the private vehicle, path followed by the private vehicle, pick-up locations of the private vehicle, arrival time of the private vehicle, and departure time of the private vehicle. In an embodiment, the private transportation system server 108 may receive a query from at least one of the application server 104 or the database server 106 to retrieve the information pertaining to the private transportation system. Further, the private transportation system server 108 may include a private transportation system portal, using which the information pertaining to the private transportation system may be provided to the application server 104. Further details and illustration of the private transportation system server 108 have been discussed in conjunction with the FIG. 7. The private transportation system server 108 may be realized through various types of servers such as, but not limited to, Java server, .NET framework, and Base4 server.

The public transportation system server 110 refers to a computing device associated with the public transportation system. In an embodiment, the public transportation system server 110 include information pertaining to the public transportation system, such as, but not limited to, the public vehicle's id, arrival time of the public vehicle, departure time of the public vehicle, travel mode of the at least one public transportation sub-trip, ticket price between different nodes, or path followed by the public vehicle. In an embodiment, the public transportation system server 110 may receive a query from at least one of the application server 104 or the database server 106 to retrieve the information pertaining to the public transportation system. Further, the private transportation system server 108 may include a public transportation system portal, using which the information pertaining to the public transportation system may be provided to the application server 104. Further details and illustration of the public transportation system server 110 have been discussed in conjunction with the FIG. 7. The public transportation system server 110 may be realized through various types of servers such as, but not limited to, Java server, .NET framework, and Base4 server.

The congestion monitoring system server 112 may refer to a computing device corresponding to a congestion monitoring system that includes information pertaining to the congestion levels at different nodes at various time intervals of the day. In an embodiment, the congestion monitoring system server 112 may receive a query from at least one of the application server 104 or the database server 106 to retrieve the information pertaining to the congestion levels. In an embodiment, the congestion monitoring system server 112 may track the location information of different users (e.g., through GPS), and based on the tracked location information, the congestion monitoring system server 112 may determine the congestion levels at various nodes. The congestion monitoring system server 112 may be realized through various types of servers such as, but not limited to, Java server, .NET framework, and Base4 server.

The carbon footprint calculator 114 refers to a computing device that maintains information pertaining to the carbon emission levels at different nodes at various time intervals of the day. In an embodiment, the carbon footprint calculator 114 may receive a query from at least one of the application server 104 or the database server 106 to retrieve the information pertaining to the carbon emission levels. In such a scenario, the carbon footprint calculator 114 may determine the carbon emission levels based on the information received (e.g., nodes' details, timing details etc.) from at least one of the application server 104 and the database server 106. The carbon footprint calculator 114 may be realized through various types of servers such as, but not limited to, Java server, .NET framework, and Base4 server.

The network 116 corresponds to a medium through which content and messages/signals flow between various devices of the system environment 100. Examples of the network 116 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 116 in accordance with various wired and wireless communication protocols such as Transmission Control Protocol and Internet Protocol (TCP/IP), User Datagram Protocol (UDP), and 2G, 3G, or 4G communication protocols.

Figure 2:
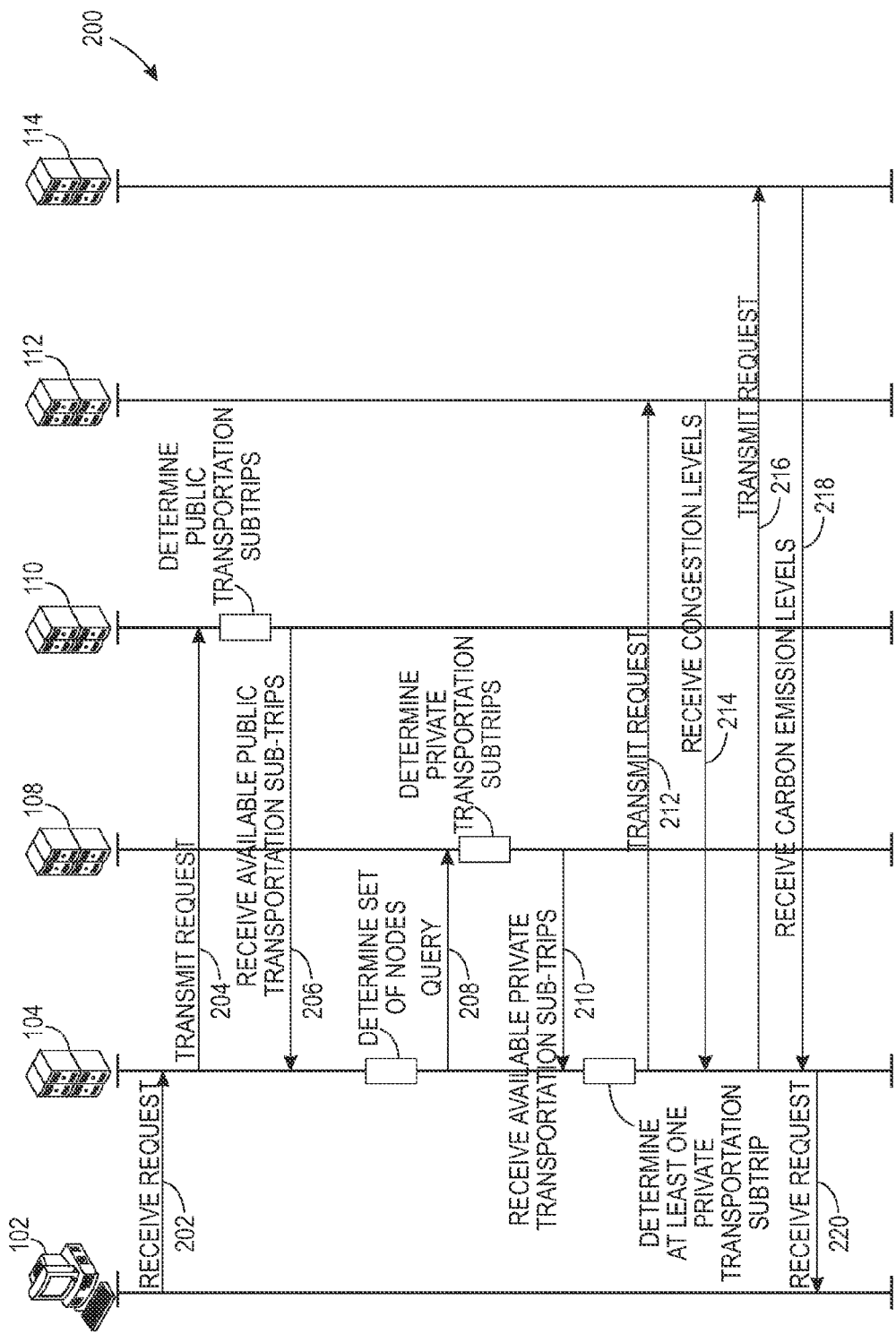
FIG. 2 illustrates a message flow diagram, in accordance with at least one embodiment.

FIG. 2 illustrates a message flow diagram 200 illustrating flow of the messages/data between different components for the system environment 100, in accordance with at least one embodiment. The message flow diagram 200 has been described in conjunction with FIG. 1.

A request from the user-computing device 102 for determining the one or more routes is received (depicted by message 202). The application server 104 receives the request. As discussed, the application server 104 may receive the request from the traveler's portal installed on the user-computing device 102, or through the user interface presented to the user. The user may provide the first set of parameters using the traveler's portal or the user interface. The first set of parameters includes at least one of the originating node, the destination node, the start time for the trip, and the set of preferences.

The application server 104 transmits the request to the public transportation system server 110 (depicted by message 204). The application server 104 transmits the request, along with the first set of parameters, to receive the available public transportation sub-trips between the originating node and the destination node. The public transportation system server 110 extracts the first set of parameters from the message 204. Based on the first set of parameters the public transportation system server 110 determines the available public transportation sub-trips between the originating node and the destination node.

The application server 104 receives the available public transportation sub-trips between the originating node and the destination node (depicted by message 206). Based on the received available public transportation sub-trips, the application server 104 determines a plurality of intermediate nodes between the originating node and the destination node. Further, the application server 104 determines a set of nodes based on the originating node, the destination node, and the plurality of intermediate nodes. Thereafter, the application server 104 sorts the set of nodes in increasing order of distance from the originating node.

As an example, the application server 104 receives following three available public transportation sub-trips between the originating node (o) and the destination node (d):

Public transportation sub-trip 1: originating node (o)→node A→node B

Public transportation sub-trip 2: node B→node C

Public transportation sub-trip 3: node C→destination node (d)

In such a scenario, the application server 104 determines that the plurality of intermediate nodes includes {node A, node B, and Node C}. In an embodiment, list of the plurality of intermediate nodes may be pruned based on the maximum deviation of distance from shortest distance between the originating node (o) and the destination node (d), provided by the user. Further illustrations of such scenario have been discussed in conjunction with FIG. 4 and FIG. 8. It will be understood by a person skilled in the art that the determination of the plurality of intermediate nodes should not be restricted to above disclosed method (i.e., through public transportation sub-trips). Other known techniques for determining the nodes on a geographical map may also be utilized for determining the plurality of intermediate nodes, without limiting the scope of the disclosure.

In an embodiment, the application server 104 may query the database server 106 to determine the available public transportation sub-trips. Further details about this scenario have been discussed in conjunction with FIG. 4.

The application server 104 queries the private transportation system server 108 (depicted by message 708). The application server 104 queries the private transportation system server 108 to determine the private transportation sub-trips between a first node, from the sorted set of nodes, and a second node, from the sorted set of nodes. In an embodiment, the second node has greater distance from the originating node than the first node. The private transportation system server 108 determines the available private vehicles at the required time intervals, and based on such information, the private transportation system server 108 determines available private transportation sub-trips between the first node and the second node. Further details and illustrations about the determination of the private transportation sub-trip have been discussed in conjunction with the FIG. 4.

The application server 104 receives the available private transportation sub-trips between the first node and the second node (depicted by message 210). In an embodiment, the application server 104 receives all the private transportation sub-trips between the first node and the second node, from the private transportation system server 108.

In an alternate embodiment, application server 104 may determine the private transportation sub-trips between the first node and the second node by querying the database server 106. Further details about this scenario have been discussed in conjunction with FIG. 4.

In an embodiment, the application server 104 determines at least one public transportation sub-trip that complements the private transportation sub-trip between the first node and the second node. That is, the application server 104 determines the at least one public transportations sub-trip such that the at least one public transportations sub-trip and the private transportation sub-trip completes the path between the originating node and the destination node. Further details about the determination of the one or more routes between the originating node and the destination node have been discussed in conjunction with the FIG. 4.

The application server 104 transmits a request to congestion monitoring system server 112 (depicted by message 212). The application server 104 transmits the details (e.g., nodes' details, timing details, etc.) of the at least one public transportation sub-trip and the private transportation sub-trip to the congestion monitoring system server 112 for receiving congestion levels at different nodes. The congestion monitoring system server 112 may determine the congestion levels on different nodes received from the application server 104. Further, the congestion monitoring system server 112 may determine the congestion levels at the timing details received from the application server 104.

In an alternate embodiment, the application server 104 may query the database server 106 to receive the information pertaining to the congestion levels on different nodes.

The application server 104 receives the congestion levels from the congestion monitoring system server 112 (depicted by the message 214). The application server 104 may utilize the received congestion levels to prune the list of the one or more routes determined between the originating node and the destination node. Further details and illustration of the pruning of the one or more routes have been provided in conjunction with FIG. 4.

The application server 104 transmits the request to carbon footprint calculator 114 (depicted by message 216). The application server 104 transmits the details (e.g., nodes' details, timing details, etc.) of the at least one public transportation sub-trip and the private transportation sub-trip to the carbon footprint calculator 114 for receiving the carbon emission levels at different nodes. The carbon footprint calculator 114 determines the carbon emission levels at the different nodes. Further, the carbon footprint calculator 114 determines the carbon emission levels at the time intervals included in message received from the application server 104.

The application server 104 receives the carbon emission levels from the carbon footprint calculator 114 (depicted by message 218). The application server 104 may utilize the received carbon-emission levels to prune the list of the one or more routes determined between the originating node and the destination node.

In an embodiment, the application server 104 may utilize the received congestion levels and the carbon-emission levels to determine the trip scores for the different routes determined between the originating node and the destination node. Based on the trip score, the application server 104 may rank the one or more routes. Further details about the ranking of the routes have been discussed in conjunction with FIG. 5.

The application server 104 transmits the response of the user's request (depicted by message 220). In an embodiment, the application server 104 presents the ranked one or more routes on the display device associated with the user-computing device 102. In an alternate embodiment, the application server 104 may present the ranked one or more routes on the user interface accessed over the network 116.

Figure 3:
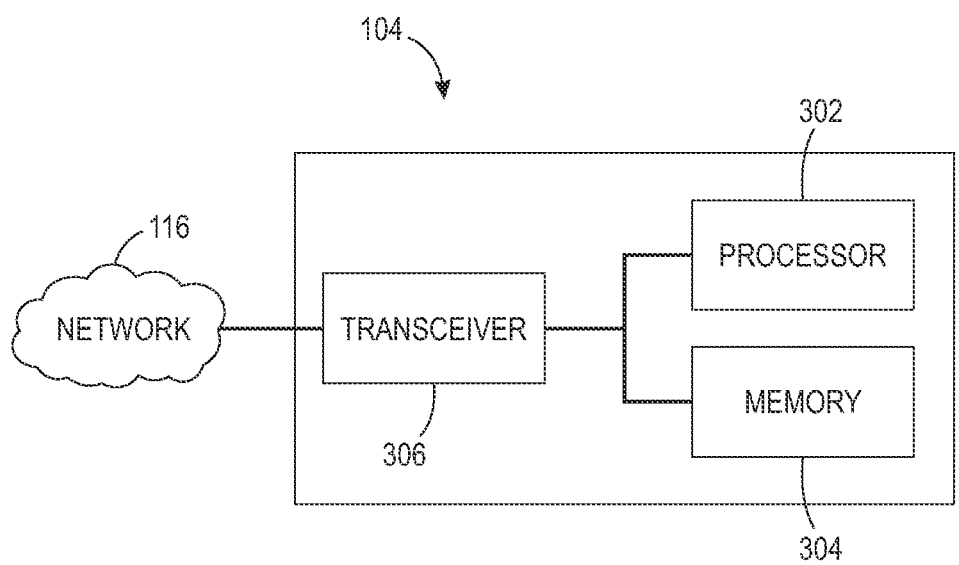
FIG. 3 is a block diagram illustrating an application server for determining one or more routes, in accordance with at least one embodiment.

FIG. 3 is a block diagram illustrating the application server 104, in accordance with at least one embodiment. The application server 104 includes a processor 302, a memory 304, and a transceiver 306.

The processor 302 is coupled to the memory 304 and the transceiver 306. The processor 302 includes suitable logic, circuitry, and/or interfaces that are operable to execute one or more instructions stored in the memory 304 to perform predetermined operations. The memory 304 may be operable to store the one or more instructions. The processor 302 may be implemented using one or more processor technologies known in the art. Examples of the processor 302 include, but are not limited to, an X86 processor, a RISC processor, an ASIC processor, a CISC processor, or any other processor.

The memory 304 stores a set of instructions and data. Some of the commonly known memory implementations include, but are not limited to, a random access memory (RAM), a read only memory (ROM), a hard disk drive (HDD), and a secure digital (SD) card. Further, the memory 304 includes the one or more instructions that are executable by the processor 302 to perform specific operations. It would be apparent to a person having ordinary skill in the art that the one or more instructions stored in the memory 304 enables the hardware of the application server 104 to perform the predetermined operation.

The transceiver 306 transmits and receives messages and data to/from various components of the system environment 100. Examples of the transceiver 306 may include, but are not limited to, an antenna, an Ethernet port, a USB port or any other port that can be configured to receive and transmit data. The transceiver 306 transmits and receives data/messages in accordance with the various communication protocols, such as, TCP/IP, UDP, and 2G, 3G, or 4G communication protocols. Operation of the application server 104 has been described in conjunction with FIG. 4.

Figure 4:
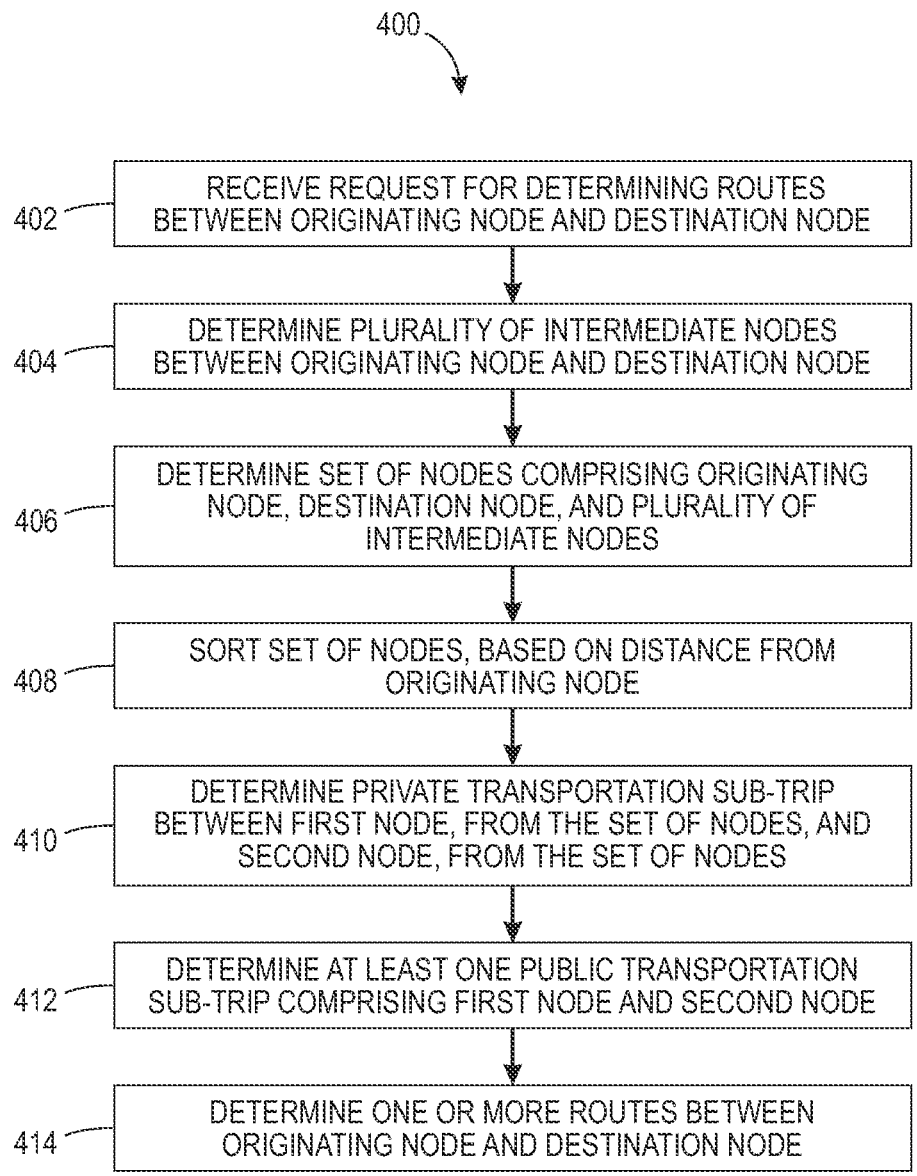
FIG. 4 is a flowchart illustrating a method for determining the one or more routes, in accordance with at least one embodiment.

FIG. 4 is a flowchart 400 illustrating a method for determining the one or more routes, in accordance with at least one embodiment. In an embodiment, the method for determining the one or more routes is implemented on the application server 104.

At step 402, a request is received for determining the one or more routes between the originating node and the destination node. The processor 302 may receive the request. In an embodiment, a user may access the application server 104 (e.g., through the client application or the web interface) to provide the first set of parameters. The first set of parameters may include at least one of the originating node for the trip, the destination node for the trip, the start time for the trip, or the set of preferences. The set of preferences may include ridesharing constraints, tolerance constraints, and route constraints. Through the ridesharing constraints, the user may select the preferences pertaining to the one or more co-passengers or pertaining to the type of the private vehicle. For example, the user may specify the make (e.g., Sedan or Hatchback) of the private vehicle that needs to be ensured while determining the private transportation sub-trip. Similarly, other preferences in the ridesharing constraints may include maximum number of co-passengers in the private transportation sub-trip, acquaintance with the co-passengers, maximum deviation of distance from shortest distance between the originating node and the destination node, or maximum deviation of time from the start time for the trip. In an embodiment, the maximum deviation of distance from the shortest distance between the originating node and the destination node depicts the overhead distance, from the shortest distance, that the user may be ready to traverse. For example, if the shortest distance between the originating node and the destination node is 10 KM, through one of the routes, and the maximum deviation of the distance specified by the user is 1 KM, then only those routes that have distance between the originating node and the destination node less than or equal to 11 KM will be determined for the user. In a similar way, if the user has specified maximum deviation of time as 10 minutes, then only those vehicles that leave the originating node within 10 minutes (early or after), from the start time specified by the user.

In an embodiment, through the tolerance constraints, the user may select preferences pertaining to the relevancy level for various parameters, such as carbon-footprint on the trip, monetary cost for the trip, duration of the trip, and the like. For example, the user may select the relevancy levels for the carbon-footprint, the cost, and the duration as "does not matter", "most important", and "important", respectively. The tolerance constraints may also include at least one of maximum number of hops in the trip, maximum deviation from the originating node, maximum deviation from the destination node, maximum distance of walking sub-trips, or maximum waiting time in the trip.

In an embodiment, through the route constraints, the user may specify preferences pertaining to the one or more routes that will be determined by the processor 302. For example, the user may specify that a particular node should be included/excluded in the determined routes. Other preferences included in the route constraints may include at least one of inclusion of a route in the trip, exclusion of a route in the trip, travel mode of the trip (e.g., public transportation only, private transportation only, or combination of public transportation and private transportation), or a preferred time for the trip. Table 1 illustrates a first set of parameters received from the user:

TABLE 1

Illustration of the first set of parameters

| | First set of parameters | | Value of the parameter |
|---|---|---|---|
| | Originating Node | | o |
| | Destination Node | | d |
| | Start Time | | 08:00 AM |
| Set of Preferences | Ride Sharing Constraints | Make of the private vehicle | Sedan |
| | | Maximum number of co-passengers | Four |
| | | Acquaintance with the co-passengers | Working in same organization |
| | | Maximum deviation from the shortest distance between o and d | 1 KM |
| | | Maximum deviation from the start time | 10 minutes |
| | Tolerance Constraints | Relevancy level for Carbon-Footprint | Does not matter |
| | | Relevancy level for Cost | Most Important |
| | | Relevancy level form Duration | Important |
| | | maximum number of hops | Two |
| | | maximum deviation from o | 200 meters |
| | | maximum deviation from d | 200 meters |
| | | maximum distance of walking sub-trips | 200 meters |
| | | maximum waiting time in the trip | 10 minutes |
| | Route constraints | Include this node | B |
| | | Exclude this node | C |
| | | Include this route | o-A-B-d |
| | | Exclude this route | o-A-C-d |
| | | Travel mode for the trip | Both |

It can be observed from Table 1 that the user may provide values for various preferences. For example, the user wants to determine the one or more routes between the originating node (i.e. o) and the destination node (i.e., d) at a start time of 08:00 AM. The maximum deviation of distance from the shortest distance between o and d is 1 KM and maximum deviation of time from the start time (i.e., 08:00 AM) is 10 minutes. In a similar way, values for the ridesharing constraints, tolerance constraints and the route constraints are provided by the user, as depicted in Table 1. It will be apparent to a person skilled in the art that the values depicted in Table 1 are for illustration purposes only and different values, other than exemplified in Table 1, may be provided by the user, while requesting for the determination of the one or more routes.

In an alternate embodiment, the processor 302 receives the first set of parameters through a traveler's portal installed on the user-computing device 102. Illustration of the traveler's portal to provide the first set of parameters has been provided in conjunction with FIG. 6.

At step 404, the plurality of intermediate nodes between the originating node (i.e., o) and the destination node (i.e., d) are determined. In an embodiment, the processor 302 determines the plurality of intermediate nodes (e.g., $I_s$) between the originating node and the destination node. In an embodiment, the plurality of the intermediate nodes ($I_s$) are determined, such that the sum of the distances from o to I and I to d is less than b times the shortest distance between o and d. In an embodiment, the value of b may be provided by the user along with the set of preferences. In an embodiment, the processor 302 queries the database server 106 to retrieve the information pertaining to the public transportation system that include the information about the path followed by the public vehicles between the originating node and the destination node. Based on the information retrieved from the database server 106, the processor 302 may determine the plurality of the intermediate nodes.

At step 406, the set of nodes is determined. The processor 302 determines the set of nodes based on the plurality of intermediate nodes between the originating node and the destination node, as determined in the step 404. In an embodiment, the set of nodes includes the originating node, the destination node, and the plurality of intermediate nodes.

At step 408, the set of nodes is sorted based on distance from the originating node. In an embodiment, the processor 302 determines the distance of each of the intermediate node (i.e., I) from the originating node and sort the set of nodes based on increasing distance from the originating node. For example, if the distance of node A, node B, and node C from the originating node (i.e. o) is 5 KM, 2 KM, 3 KM, respectively, then the processor 302 may first determine the set of nodes (in conjunction with the step 406) as o, node A, node B, node C, and d. Subsequently, the processor 302 may sort the set of node to obtain o, node B, node C, Node A, and d.

At step 410, the private transportation sub-trip is determined between a first node, from the set of nodes, and a second node, from the set of nodes. In an embodiment, the second node has greater distance from the originating node than the first node. The processor 302 may query the database server 106 to retrieve the information pertaining to the private transportation system that includes the information pertaining to the availability of the private vehicles at different nodes in the set of nodes. Based on the retrieved information, the processor 302 may determine the private transportation sub-trip between the first node and the second node. In an embodiment, there are three possibilities for the determined private transportation sub-trip:

(1) Private transportation sub-trip travels from the originating node (o) to an intermediate node (e.g., $I_k$)
(2) Private transportation sub-trip travels from the intermediate node ($I_k$) to the destination node (d)
(3) Private transportation sub-trip travels between two intermediate nodes (e.g., $I_{k1}$ and $I_{k2}$)

At step 412, the at least one public transportation sub-trip is determined. In an embodiment, the processor 302 queries the database server 106 to retrieve the information pertaining to the public transportation system that includes the availability of the public vehicles at different nodes in the set of nodes. Based on the retrieved information, the processor 302 determines the at least one public transportation sub-trip. In an embodiment, the at least one public transportation sub-trip is determined such that the at least one public transportation sub-trip complements the determined private transportation sub-trip. That is, the combination of the private transportation sub-trip and the at least one public transportation sub-trip completes the trip between the originating node and the destination node. In an embodiment, corresponding to each of the three possibilities (discussed in conjunction with the step 410), the processor 302 determines the at least one public transportation sub-trip as described below:

(1) When the private transportation sub-trip travels from the originating node (o) to the intermediate node ($I_k$): In such a scenario, the processor 302 determines the at least one public transportation sub-trip (based on the retrieved information from the database server 106) from the intermediate node ($I_k$) to the destination node (d).
(2) When the private transportation sub-trip travels from the intermediate node ($I_k$) to the destination node (d): In such a scenario, the processor 302 determines the at least one public transportation sub-trip (based on the retrieved information from the database server 106) from the originating node (o) to the intermediate node ($I_k$).
(3) When the private transportation sub-trip travels between two intermediate nodes (e.g., $I_{k1}$ and $I_{k2}$): In such a scenario, the processor 302 determines the at least one public transportation sub-trip (based on the retrieved information from the database server 106) from the originating node (o) to first intermediate node ($I_{k1}$) and from second intermediate node ($I_{k2}$) to the destination node (d).

In an embodiment, the at least one public transportation sub-trip may be traversed by one public vehicle (e.g., a bus). In an alternate embodiment, the at least one public transportation sub-trip may be traversed by a combination of public vehicles (e.g., one leg of the public transportation sub-trip traversed by bus and other leg of the public transportation sub-trip traversed by train). In a similar way, the public transportation sub-trip may include more than two legs, without departing from the scope of the disclosure. Illustration of such a scenario has been discussed in conjunction with the FIG. 8.

At step 414, the one or more routes are determined between the originating node and the destination node. The processor 302 determines the one or more routes by combining the private transportation sub-trip and the at least one public transportation sub-trip. It will be apparent to a person skilled in the art that depending upon the different availabilities of the private transportation sub-trips and the public transportation sub-trips, the processor 302 may determine the different options for the one or more routes between the originating node and the destination node. In an embodiment, considering the maximum distance of walking sub-trip, as provided by the user in conjunction with the step 402, the processor 302 may append the walking sub-trip in the one or more routes.

Figure 5:
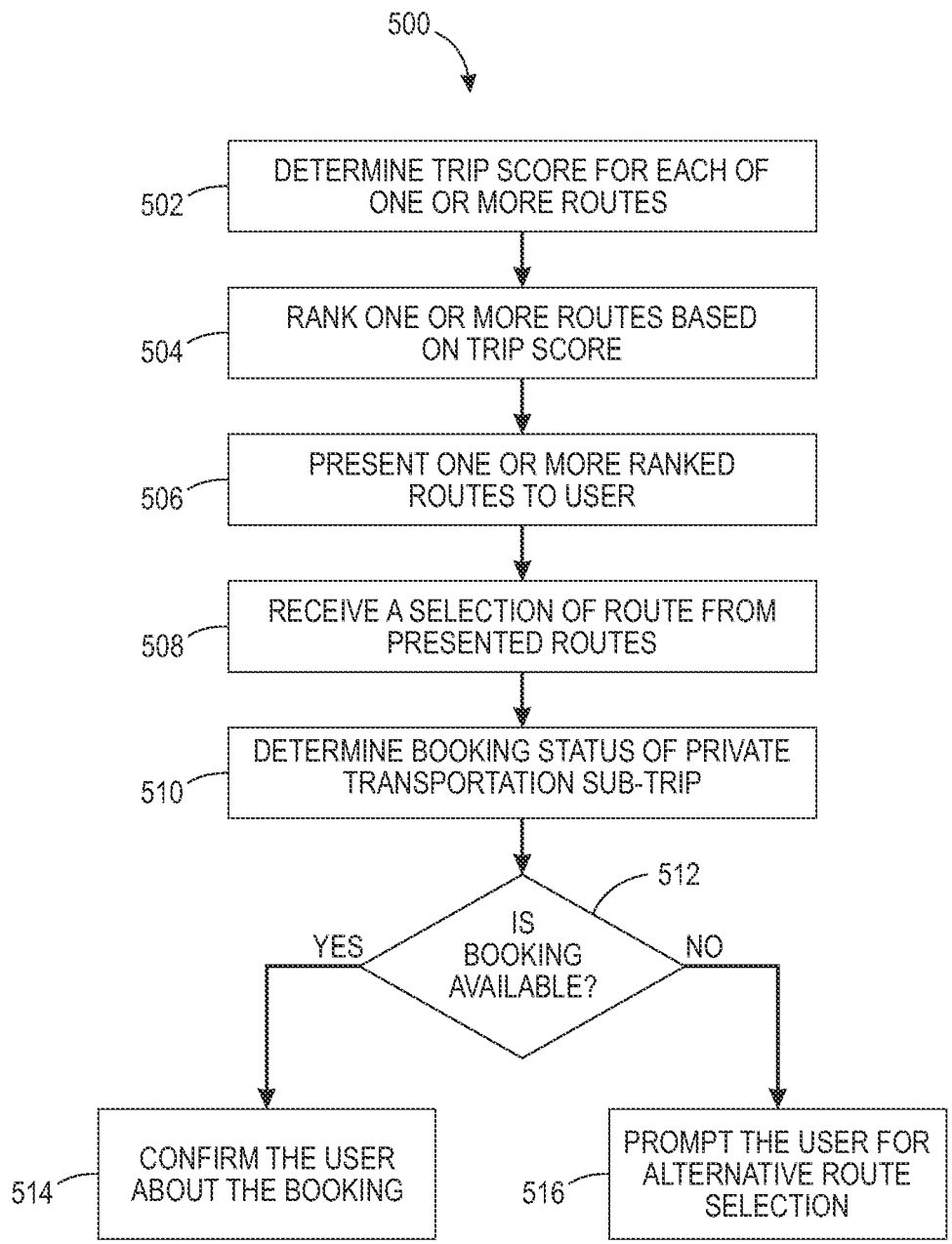
FIG. 5 is a flowchart illustrating a method for trip planning, in accordance with at least one embodiment.

FIG. 5 is a flowchart 500 illustrating a method for trip planning, in accordance with at least one embodiment. In an embodiment, the method for trip planning is implemented on the application server 104.

At step 502, a trip score corresponding to each of the one or more routes is determined. Prior to determining the trip score, the processor 302 determines the one or more routes, as described in conjunction with FIG. 4. Thereafter, the processor 302 determines the trip score based on the set of preferences provided by the user. For example, if the user provides the relevancy levels for "cost", "duration", and "carbon-footprint" as "most important", "important", and "does not matter", respectively, then the processor 302 may translate these relevancy levels to weights as 1.0, 0.5, and 0, respectively. It will be understood by a person skilled in the art that these weights are for illustrations purposes only and other criteria may also be utilized for translating the relevancy levels to weights. Subsequently, the processor 302 may consider a weighted sum of these different relevancy levels, while determining the trip score. For example, the processor 202 may utilize below mentioned equations for determining the trip score associated with each of the routes:

$$S_R = \Sigma_i S_{STi} \quad (1)$$

$$S_{STi} = \Sigma_m W_m * V_{im} \quad (2)$$

where,
 $S_R$=Trip score associated with the route R,
 $S_{STi}$=Trip score associated with the sub-trip i,
 $W_m$=Weight assigned to the preference m, and
 $V_{im}$=value of the preference m for the sub-trip i.

In an embodiment, prior to determining the trip score for each of the one or more routes, the processor 302 determines whether any of the determined one or more routes may be pruned/removed, based on the set of preferences. For example, a route, from the one or more routes, includes a node that the user had opted to exclude (in the set of preferences), the processor 302 may remove that route before determining the trip score. In a similar way, other parameters in the set of preferences (as disclosed above) may be utilized to prune/remove the list of determined one or more routes.

At step 504, the one or more routes are ranked. The processor 302 ranks the one or more routes based on the trip score determined in conjunction with the step 502. In an embodiment, the processor 302 ranks the one or more routes in decreasing order of the trip score. That is, the route with the highest value of the trip score is ranked highest, and the route with lowest value of the trip score is ranked lowest.

At step 506, the one or more ranked routes are presented to the user. In an embodiment, the processor 302 may transmit the one or more routes to the user-computing device 102. Subsequently, a display device associated with the user-computing device 102 may present the one or more routes to the user. In an alternate embodiment, the one or more ranked routes are presented on the user interface accessed on the application server 104.

At step 508, a selection of a route, from the one or more presented routes, is received. In an embodiment, the user may select the route based on his/her convenience, using the user-computing device 102. The processor 302 may receive the selection through the transceiver 306.

At step 510, a booking status for the private transportation sub-trip is determined. As discussed in conjunction with the FIG. 4, the one or more routes include the private transportation sub-trip. The processor 302 determines the booking status of the private transportation sub-trip. In an embodiment, for determining the booking status, the processor 302 may query the private transportation system server 108. The private transportation system server 108 may reply to the processor 302, based on the availability of the private vehicles at the required time. In an alternate embodiment, the booking status may be determined based on the updated database server 106 that includes latest information pertaining to the availabilities of the private vehicles, as disclosed in conjunction with FIG. 4.

In an alternate embodiment, when the private transportation sub-trip corresponds to a ride-sharing option, the processor 302 may check the availability of the car/bike owner to check the availability of the ride-sharing. In an embodiment, the details about the ride-sharing (i.e., ridesharing constraints) may be provided by the users through the traveler's portal, and the processor 302 may utilize this information to determine the one or more routes. Subsequently, the processor 302 may determine the availability of the car/bike owner by notifying the respective owner. The notification may be through different means, such as short messaging service (SMS), email, voice-call, and the like. Further, the notification may include the details of the travelers (e.g., name, address, contact details, employer's name, etc.) Based on the received notification, the owner may reply with a confirmation or rejection to share the ride with the traveler.

At step 512, it is determined whether the booking is available for the private vehicle. In case, if the booking is available, step 514 is performed, else step 516 is performed.

At step 514, the user is confirmed about the booking status. The processor 302 confirms the user about the booking status on the display device associated with the user-computing device 102. In an alternate embodiment, the processor 302 may confirm the user on the user interface accessed on the application server 104.

At step 516, the user is prompted to select an alternative route, from the one or more presented routes. That is, if the processor 302 determines that the private vehicle is not available, as required in the private-transportation sub-trip, then the user may be prompted to select an alternative route, from the one or more presented routes. It will be apparent to a person skilled in the art that the steps 510 to 516 may be repeated for the alternative route selected by the user. In an embodiment, if the booking of the private vehicle fails for a pre-determined number of times, then the failure of the booking for the pre-determined number of times may be communicated to the user and trip planning request from the user may be terminated.

Figure 6:
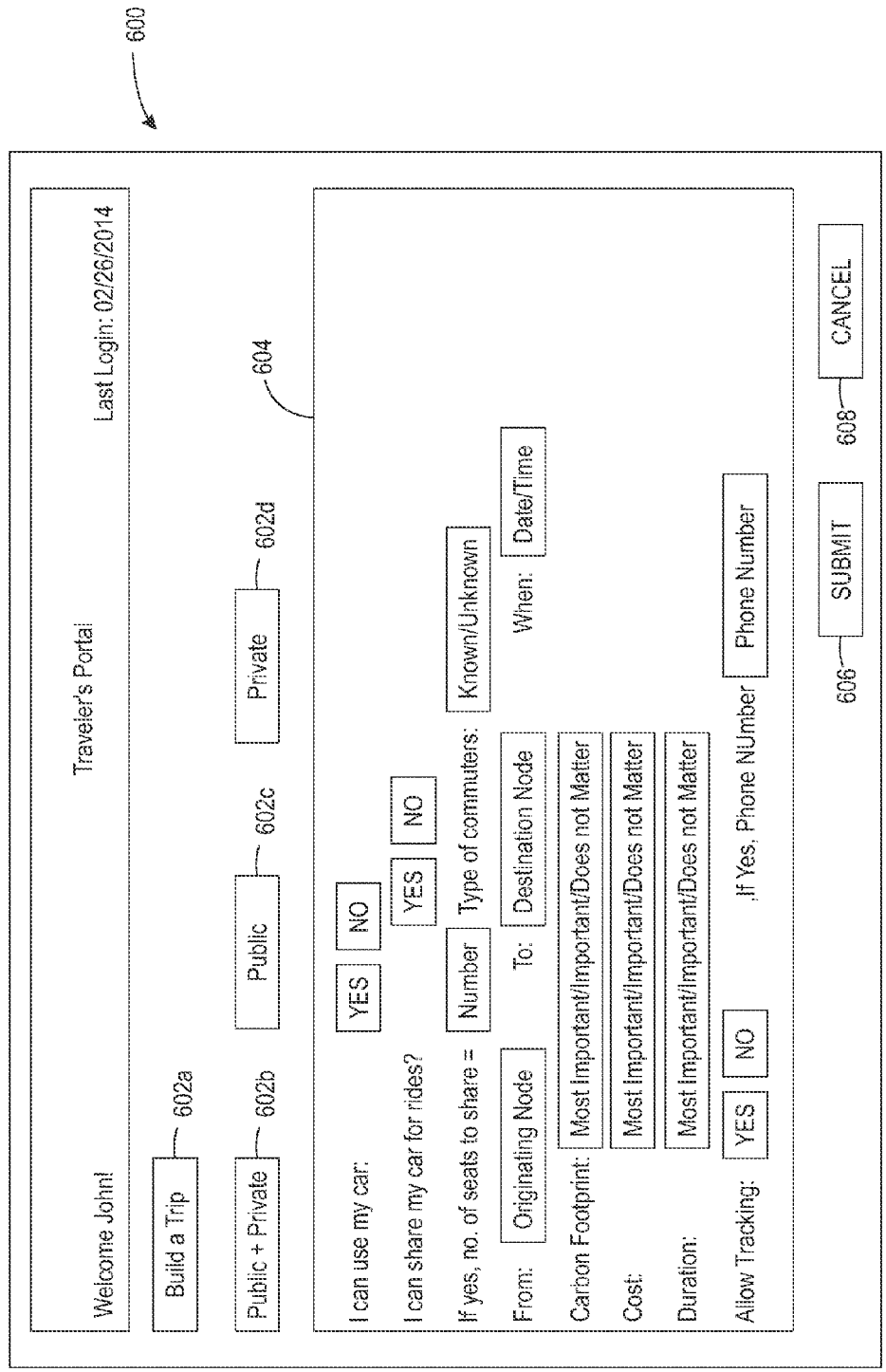
FIG. 6 illustrates a block diagram for a traveler's portal, in accordance with at least one embodiment.

FIG. 6 illustrates a block diagram 600 for a traveler's portal, in accordance with at least one embodiment. The traveler's portal may be utilized by the user to provide the first set of parameters. In an embodiment, the traveler's portal may be installed on the user-computing device 102 (e.g., through a client application). The block diagram 600 includes submit buttons 602a-d, a first input region 604, and submit buttons 606-608.

The submit button 602a may be utilized by the user to start the trip planning. In an embodiment, the user may press the submit button 602a to enable the buttons 602b-d that may be utilized by the user to indicate the types of transportations to be considered in determining the one or more routes. For example, the user may press the button 602b, if he/she wants that both, public transportation and private transportation, need to be included in the routes. Similarly, the button 602c may be utilized to indicate that only public transportation should be included in the routes, and the button 602d may be utilized to indicate that only private transportation should be included in the routes. On pressing different submit buttons, from the submit buttons 602b-d, the processor 302 may present different options to receive further inputs from the user.

The first input region 604 indicates different options, presented to the user, when the user selects the button 602b. It will be apparent to a person skilled in the art different options may be presented to the user, if the user selects different submit buttons (i.e., 602c and 602d). Further, it will be understood that options shown in the first input region 604 are for illustration purpose only and other options than exemplified may be added, without departing from the scope of the disclosure. It can be observed from the first input region 604 that the user can provide details, such as availability of his/her car, readiness for ride-sharing, number of seats available, acquaintance with the commuters (i.e., known/unknown), originating node, destination node, start time for the trip, relevancy levels for the carbon-footprint, duration, and the cost, tracking of the user, and the phone number of an acquaintance. Details about these inputs have already been discussed in conjunction with FIG. 4. It will be apparent to a person skilled in the art that some of the inputs required in the first input region 604 are used for determining the routes for the user (e.g., the originating node, the destination node, the start time, etc.); whereas some of the input are used for providing the availability of the private vehicle associated with the user (e.g., readiness for sharing, number of seats to share, etc.). In an embodiment, the tracking of the user may be selected by the user for trip security purpose. In such a scenario, the user may provide the contact details (e.g., phone number) of an acquaintance, with whom the tracked information may be shared (e.g., through GPS coordinates). In an alternate embodiment, the processor 302 may provide the tracked information to the congestion monitoring system server 112, which may utilize the information to determine congestion levels on different nodes on the routes.

The user may press the submit button 606 to start the determination of the routes by the processor 302. As disclosed above, the processor 302 may utilize inputs provided by the user through the traveler's portal to determine, and to rank, the one or routes between the originating node and the destination node.

The button 608 may be utilized by the user to cancel the inputs provided in the first input region 604. For example, the user may wish to change the inputs or may decide to provide the inputs later. In such a scenario, the user may use the submit button 608.

Figure 7:
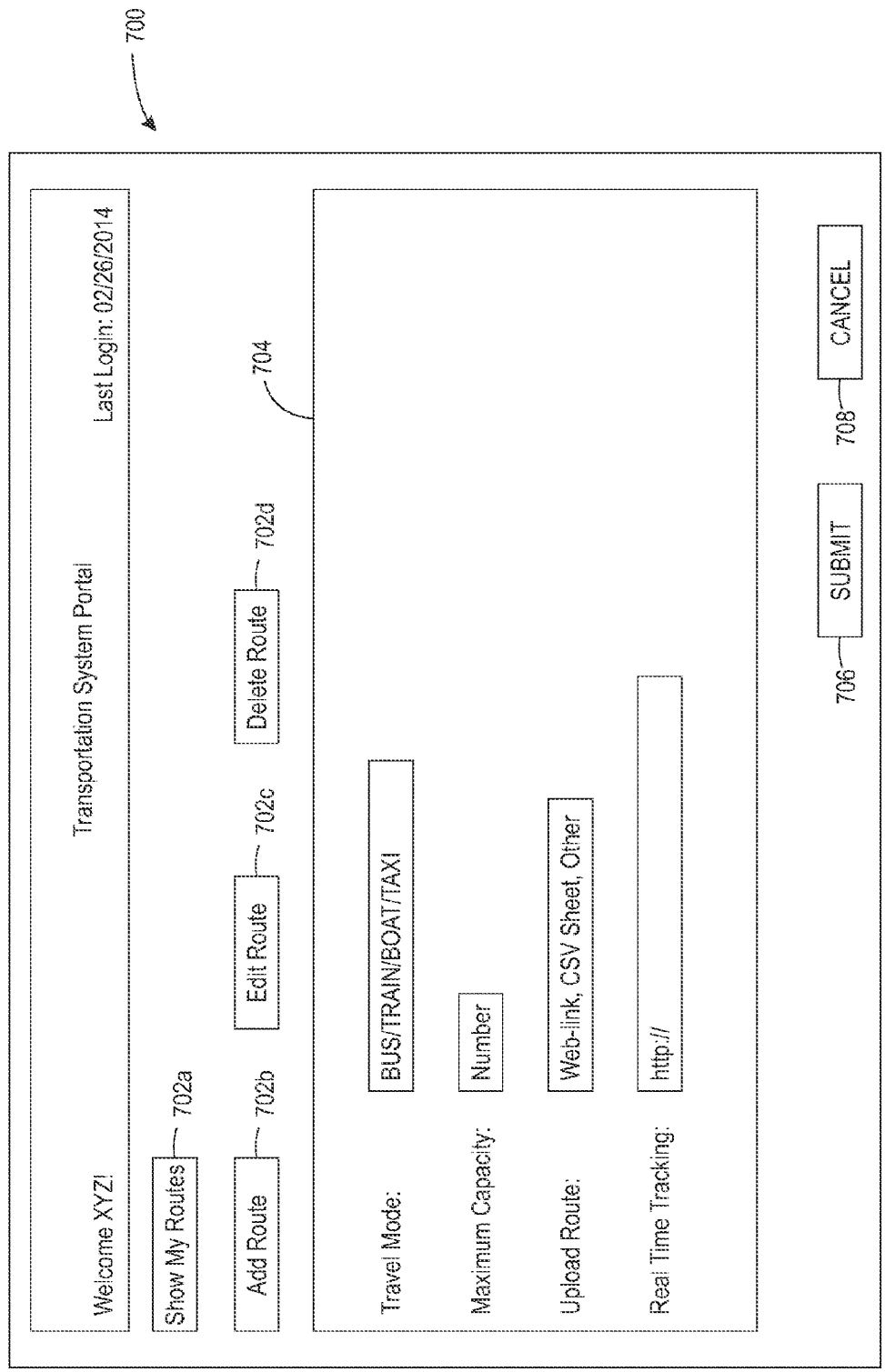
FIG. 7 illustrates a block diagram for a private/public transportations system's portal, in accordance with at least one embodiment.

FIG. 7 illustrates a block diagram 700 for a private/public transportation system's portal, in accordance with at least one embodiment of the present disclosure. The public/private transportation system's portal may be installed on the respective transportation system server (e.g., the private transportation system server 108 or the public transportation system server 110). The public/private transportation system's portal may be utilized by the respective transportation system to provide various kinds of information associated with the transportation system, as disclosed in conjunction with FIG. 4. For example, the private transportation system's portal may be utilized to provide information pertaining to the availabilities of the private vehicles, paths followed by the private vehicles, pick-up timing of the private vehicles, and so forth. In a similar way, public transportation system's portal may be utilized to provide information pertaining to the availabilities of the public vehicles, paths followed by the public vehicles, vehicle ids of the public vehicles and so forth. In an embodiment, the block diagram 700 includes submit buttons 702a-d, a second input region 704, and submit buttons 706-708.

The submit buttons 702a-d may be utilized by the public/private transportation system to provide/edit various details pertaining to the vehicle's availability. For example, the submit button 702a may be utilized to view already added paths of the public/private vehicles, submit button 702b may be utilized to add a new path for the public/private vehicles, submit button 702c may be utilized to edit the added paths, and submit button 702d may be utilized to delete the added paths.

The second input region 704 depicts an input area that can be used by the respective transportation system to add the details of the paths followed by the vehicles. It will be apparent to a person skilled in the art that different options may be presented, if different submit buttons (i.e., 702c and 702d) are selected. Further, it will be understood that options shown in the second input region 704 are for illustration purposes only and other options than exemplified may be added, without departing from the scope of the disclosure. It can be observed from the second input region 704 that various types of the details may be provided by the transportation systems, for example mode of the vehicle (e.g., Taxi/Bus/Train/Boat), number of the vehicles available on paths, options for uploading the paths through links/CSV sheet, and options for real time tracking. In an embodiment, the transportation systems may provide the paths along with other details (e.g., location coordinates, vehicles details, etc.) using web-links. In such a scenario, the information of the transportation system may be downloaded to the application server 104 through the provided web-link. In an embodiment, the transportation systems may provide the web-link for the real time tracking of the vehicles of different paths.

The button 706 may be utilized for submitting different types of details, as disclosed above. For example, post providing different types of the details, respective transportation systems may utilize the submit button 706 to submit the details.

The submit button 708 may be utilized to cancel the inputs provided in the second input region 704 (e.g., to change the inputs or to provide the inputs later).

Figure 8:
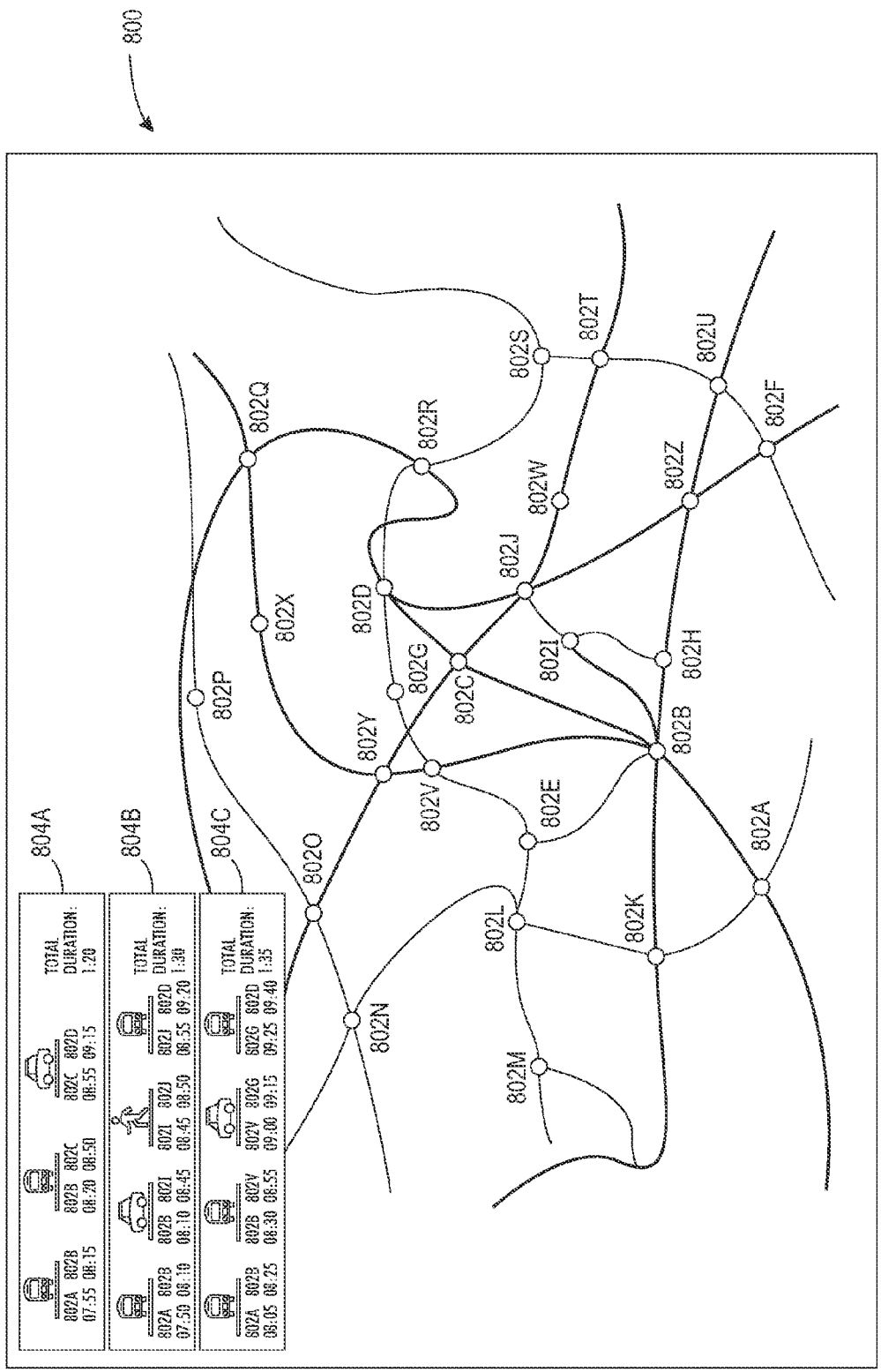
FIG. 8 illustrates a map diagram for the trip planning, in accordance with at least one embodiment.

FIG. 8 illustrates a map diagram 800 for the trip planning, in accordance with at least one embodiment of the present disclosure. The map diagram 800 includes nodes 802a-z, and the routes 804a-c. The nodes 802a-z depict various geographic locations interconnected by the different paths, depicted in the map diagram 800. The routes 804a-c depict different routes determined by the processor 302 that are presented to the user. FIG. 8 has been explained in conjunction with the FIG. 4, and FIG. 5.

In accordance with the step 402, a request from the user is received. In an embodiment, the user wants to plan the trip between the node 802a (i.e., the originating node) and the node 802d (i.e., the destination node). Further, the user provides the start time and the set of preferences in the request. Further details about the first set of parameters and the set of preferences have been discussed in conjunction with FIG. 4.

In accordance with the step 404, the processor 302 determines the plurality of the intermediate nodes between the originating node (i.e., the node 802a) and the destination node (i.e., the node 802d). As discussed in conjunction with the FIG. 4, the processor 302 determines the plurality of intermediate nodes ($I_s$), such that the sum of the distance from the node 802a to I and I to 802d is less than b times the shortest distance between the node 802a and the node 802d. In an embodiment, considering the value of the parameter b, the processor 302 determines that the nodes 802b, the node 802c, the node 802i, the node 802j, the node 802v, and the node 802g are such that the sum of the distance from 802a to any of these nodes and the distance from that node to the node 802d is less than b times the shortest distance between 802a and 802d.

In accordance with the step 406, a set of nodes is determined. The processor 302 determines the set of nodes by combining the node 802a, the node 802d, and the plurality of intermediate nodes. That is, the processor 302 determines the set of nodes as: {the node 802a, the node 802b, the node 802c, the node 802e, the node 802i, the node 802j, the node 802v, the node 802g, and the node 802d}.

In accordance with the step 408, the processor 302 sorts the set of nodes based on the distance from the node 802a. In an embodiment, the processor 302 sorts the set of nodes based on the increasing distance from the node 802a. In an embodiment, the processor 302 determines the sorted set of nodes as: {the node 802a, the node 802b, the node 802c, the node 802e, the node 802j, the node 802c, the node 802v, the node 802g, and the node 802d}.

In accordance with the step 410, the processor 302 determines the private transportation sub-trip. The processor 302 queries the transportation database hosted on the database server 106 to determine the private transportation sub-trip. In an embodiment, based on the information of the private vehicle's availability, the processor 302 determines that the private vehicles are available between the node 802b and the node 802i, between the node 802c and the node 802d, and between the node 802v and the node 802g. In an embodiment, these three private transportation sub-trips between the nodes are available through car-pooling. It will be apparent to a person skilled in the art that at other nodes, from the set of nodes, private vehicles may be available, but at different time intervals than specified by the user in the set of preferences. Thus, the processor 302 does not consider such private vehicles while determining the private transportation sub-trip. Further, the processor 302 determines that the distance between the node 802i and the node 802j may be traversed through the feet (i.e., walking sub-trip) and the distance between the node 802i and the node 802j is less than the maximum distance traversable through walking sub-trips (as provided in the set of preferences).

It will be apparent to a person skilled in the art that the processor 302 may also query the private transportation system server 108 to determine the private transportation sub-trips.

In accordance with the step 412, the processor 302 determines the at least one public transportation sub-trip. The processor 302 queries the database server 106 to retrieve the information pertaining to the public transportation system and find the at least one public transportation sub-trip, such that the combination of the private transportation sub-trip and the at least one public transportation sub-trip completes the trip between the node 802a and the node 802d. It will be apparent to a person skilled in the art that since the distance between the node 802i and the node 802j is also traversable through the walking sub-trip, the processor 302 may include the walking sub-trip between the node 802i and the node 802j, if public transportation is not available between the node 802i and the node 802j.

Further, it will be apparent that the processor 302 may determine the at least one public transportation sub-trip by querying the public transportation system server 110, without limiting the scope of the invention.

In an embodiment, corresponding to the three private transportation sub-trips (i.e., between the node 802b and the node 802i, between the node 802c and the node 802d, and between the node 802v and the node 802g), the processor 302 determines the public transportation sub-trips as:

1. From the node 802a→the node 802b, and the node 802j→the node 802d. That is, the processor 302 determines that combination of two public transportation sub-trips (i.e., from the node 802a to the node 802b and from the node 802j to the node 802d) complements the private transportation sub-trip from the node 802b to the node 802i. It will be apparent to a person skilled in the art that in such a scenario, the distance between the node 802i and the node 802j is traversed through feet.

2. From the node 802a→the node 802b→node 802c. That is the processor 302 determines that the combination of two public transportation sub-trips (i.e., from the node 802a to the node 802b, and from the node 802b to the node 802c) complements the private transportation sub-trip from the node 802c to the node 802d 3. From the node 802a→the node 802b→the node 802v, and from the node 802g→node 802d. That is, the processor 302 determines that the combination of three public transportation sub-trips (i.e., from the node 802a to the node 802b, from the node 802b to the node 802v, and from the node 802g to the node 802d) complements the private transportation sub-trip from the node 802v to the node 802g.

4. From the node 802a→the node 802b→the node 802e→the node 802v, and from the node 802g→node 802d. That is, the processor 302 determines that the combination of four public transportation sub-trips (i.e., from the node 802a to the node 802b, from the node 802b to the node 802e, from the node 802e to the node 802v, and from the node 802g to the node 802d) complements the private transportation sub-trip from the node 802v to the node 802g.

In an embodiment, all of the public transportation sub-trips, as illustrated above are available through public vehicle "bus".

In accordance with the step 414, the one or more routes are determined. The processor 302 determines the one or more routes by combining the private transportation sub-trip and the public transportation sub-trips, as disclosed in conjunction with the FIG. 4. Further, the processor 302 includes the walking sub-trip in the one or more routes. In an embodiment, corresponding to the above illustrations of the determined public transportation sub-trips and the private transportation sub-trip, the processor 302 determines the one or more routes between the node 802a and the node 802d as:

Route 1: The node 802a→the node 802b→the node 802i→the node 802j→the node 802d

Route 2: The node 802a→the node 802b→the node 802c→the node 802d

Route 3: The node 802a→the node 802b→the node 802v→the node 802g→the node 802d

Route 4: The node 802a→the node 802b→the node 802e→the node 802v→the node 802g→the node 802d As disclosed above, the distance between the node 802b the node 802i, between the node 802c and the node 802d, and between the node 802v and the node 802g are traversed through the private vehicle (i.e., through the car-pooling); whereas, distance between the other nodes are traversed through the public vehicle (i.e., the bus). Further, the distance between the node 802i and the node 802j is traversed through the feet. It will be apparent to a person skilled in the art that if the processor 302 determines that the distance between the node 802i and the node 802j may also be traversed through the public vehicle, the processor 302 may also include that public transportation sub-trip, while determining the one or more routes.

In accordance with the step 502, the processor 302 determines the trip score for each of the routes. As disclosed in conjunction with the step 502, prior to determining the trip score, the processor 302 may determine whether a route may be removed/pruned from the list of determined one or more routes, based on the set of preferences. In an embodiment, the user specifies that the node 802e should not be included in the planned trip between the node 802a and the node 802d. In such a scenario, the processor 302 may not consider the route 4 (as determined above). For the remaining three routes (i.e., the route 1, the route 2, and the route 3), the processor 302 determines the trip score. In an embodiment, the trip score determine for the three routes is illustrated in Table 2:

TABLE 2

Illustration of the trip score, determined for the one or more routes

| Route | Trip Score |
|---|---|
| Route 1: (the node 802a → the node 802b → the node 802i → the node 802j → the node 802d) | 1.41 |
| Route 2: (The node 802a → the node 802b → the node 802c → the node 802d) | 1.72 |
| Route 3: (The node 802a → the node 802b → the node 802v → the node 802g → the node 802d) | 1.32 |

It can be observed from Table 2, the route 2 (depicted by route 804a) has maximum trip score, and the route 3 (depicted by route 804c) has the minimum trip score.

In accordance with the step 504, the one or more routes are ranked. As disclosed in conjunction with the step 504, the one or more routes may be ranked based on the trip score. In an embodiment, the processor 302 ranks the one or more routes and determines the ranked routes as:

The route 2 (depicted by route 804a): The node 802a→the node 802b→the node 802c→the node 802d

The route 1 (depicted route 804b): The node 802a→the node 802b→the node 802i→the node 802j→the node 802d

The route 3 (depicted by route 804c): The node 802a→the node 802b→the node 802v→the node 802g→the node 802d

In accordance with the step 506, the ranked routes 804a-c are presented to the user. The routes 806a-c may be presented on the display device associated with the user-computing device 102. As can be observed from the map diagram 800, the route 804a depicts that the distance between the node 802a and the node 802b is traversed through the bus, the distance between the node 802b and the node 802c is also traversed through the bus, and the distance between the node 802c and the node 802d is traversed through the pooled-car. In a similar way, the route 802b depicts that the distance between the node 802a and the node 802b is traversed by the bus, the distance between the node 802b and the node 802i is traversed by the pooled car, the distance between the node 802i and the node 802j is traversed by the feet, and the distance between the node 802j and the node 802d is traversed by the bus. Similarly, the route 804c depicts that the distance between the node 802a and the node 802b is traversed by bus, the distance between the node 802b and the node 802v is traversed by bus, the distance between the node 802v and the node 802g is traversed by pooled-car, and the distance between the node 802g and the node 802d is traversed by bus. In addition, it can be observed that details of the timings between various nodes and total duration of the trip is also included in the routes 804a-c. For example, as depicted in the route 804a, it is presented to the user that the node 802a and the node 802b can be traversed through bus and time for this leg is 20 minutes (i.e., from 07:55 Hrs to 08:15 Hrs). Similarly, it is presented that the total duration for the trip between the node 802a and the node 802d is 1 hours 20 minutes, if traversed through the route 804a.

In accordance with the step 508, a selection of a route, from the routes 804a-c, is received from the user. In an embodiment, the routes 804a-c presented to the user are such that, the user may select at least one route. For example, the user may click (e.g., using input mouse, touch-pad, etc.) on a route to select it. It will be apparent to a person skilled in the art that based on his/her preferences, the user may select a route from the routes 804a-c.

In accordance with the step 510, booking status of the private transportation sub-trip, included in the route selected by the user, is determined. As discussed in conjunction with the step 510, if the route selected by the user includes a private transportation sub-trip, the processor 302 determines the booking status of the private transportation sub-trip. Further, as discussed in conjunction with the step 510, if the private transportation sub-trip is traversed through car-pooling, the processor 302 may confirm the availability of the pooled-car by notifying the owner of the car. For example, if the user selects the route 804a, then the processor 302 may determine the availability of the pooled-car between the node 802c and the node 802d. In such a scenario, the processor 302 may notify the owner of the private vehicle, along with the details of the user. Further, the owner of the private vehicle may confirm/reject the booking of the private vehicle, based on the details of the user.

In accordance with the step 512, it is determined whether the booking for the private transportation is available. In case, the booking of the private transportation is available, the step 514 is performed, else the step 516 is performed, as discussed in conjunction with the FIG. 5.

In accordance with the step 514, the user is confirmed about the booking. In an embodiment, when the processor 302 determines that the booking of the private transportation sub-trip is available, the processor 302 may confirm the user.

In accordance with the step 516, the user may be prompted to select an alternative route. As discussed in conjunction with the FIG. 5, if the processor 302 determines that the booking for the private transportation sub-trip is not available, the processor 302 may prompt the user to select an alternative route. For example, if the processor 302 determines that the pooled-car between the node 802c and the node 802d is not available, then the processor 302 may prompt the user to select an alternative route from the routes 804b-c. Further details about this scenario have already been described in conjunction with the FIG. 5.

In an embodiment, the application server 104 may monitor real time data pertaining to the congestion levels at different nodes on the route selected by the user. In addition, the application server 104 may monitor the location (e.g., through GPS) of the user while the user is traversing on the route. Based on the monitored congestion levels and the location, the processor 302 may determine that the user may not be able to reach a node that is the part of the selected route. Such determination may be made by the processor 302 by determining the predicted time to reach different nodes on the route, based on the known techniques in the art. In such a scenario, the application server 104 may repeat the steps 404 to 414 to determine one or more updated routes, from the location of the user to the destination node. Further, a notification corresponding to the one or more updated routes may be transmitted to the user. Subsequently, the user may select an alternative route to reach the destination node.

A person having ordinary skill in the art would understand that the scope of the disclosure is not limited to updating the routes based on the real-time location of the user. In an embodiment, the application server 104 may determine the one or more updated routes based on the location of the public/private vehicles that are included in the route selected by the user and the congestion levels at the different nodes to be traversed by those public/private vehicles.

The disclosed embodiments encompass numerous advantages. With the economic growth, transportation requirements are continuously increasing. However, the continuous expansion of the public transportation systems to cater this increasing demand is not feasible, due to infrastructure/space and cost constraints. In addition, fixed timetables and limited reach of the public transportation systems lead to people using the private vehicles for daily commutation. Increase use of private transportation has its associated disadvantages also. For example, increase in the use of the private vehicles have led to increase in carbon-emission levels, increase traffic congestion, and increased costs. The increased traffic congestion further leads to poor schedule adherence of the public transportation systems, resulting again in less inclination for the public transportation systems. Services like car-pooling have also not gained much popularity because of individuals' preferences (e.g., privacy, security, etc.). However, the navigation system disclosed as above utilizes both transportation systems (i.e., public and private) while determining the routes for a trip. In this way, individuals may select the routes that best cater to their requirements and preferences (i.e., cost, duration, etc.). In addition, by providing the set of preferences (i.e., ridesharing constraints, tolerance constraints, and route constraints), it is ensured that determined one or more routes are more relevant and appropriate for the users. For example, as discussed, users may specific the relevancy levels for various parameters (e.g., carbon-emission, duration, monetary cost, congestion levels, etc.), and those relevancy levels are translated into weights for determining the trip score, which further is utilized to rank the one or more routes.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for determining one or more routes in a navigation system have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for determining one or more routes in a navigation system, the method comprising:
   receiving, by one or more processors, a request from a user comprising a first set of parameters corresponding to a trip, wherein the first set of parameters comprises at least an originating node for the trip, a destination node for the trip, a start time for the trip, and a set of preferences associated with the trip, and wherein the set of preferences comprises at least ridesharing constraints, tolerance constraints, and route constraints;
   determining, by the one or more processors, the one or more routes between the originating node and the destination node, based on the first set of parameters, wherein the determination of the one or more routes comprises:
      identifying a plurality of intermediate nodes between the originating node and the destination node,
      determining a public transportation sub-trip or a private transportation sub-trip between a first node of the plurality of intermediate nodes and a second node of the plurality of intermediate nodes, based on an availability of a public vehicle or a private vehicle, respectively, between the first node and the second node,
   wherein each of the one or more routes comprises a combination of the public transportation sub-trip and the private transportation sub-trip; and
   ranking, by the one or more processors, the one or more routes based on a trip score, associated with each of the one or more routes, determined based on the set of preferences.

2. The method of claim 1 further comprising determining, by the one or more processors, the plurality of intermediate nodes between the originating node and the destination node, wherein the originating node, the destination node, and the plurality of intermediate nodes constitute a set of nodes.

3. The method of claim 2 further comprising sorting, by the one or more processors, the set of nodes, based on distance from the originating node.

4. The method of claim 1, wherein the private vehicle comprises at least one of a personal car, pooled car, or a hired taxi.

5. The method of claim 1, wherein the public vehicle comprises at least one of a bus, a tram, a metro, or a train.

6. The method of claim 1, wherein each of the one or more routes comprises one or more walking sub-trips that is to be traversed on foot by the user, wherein a distance of the one or more walking sub-trips, in each of the one or more routes, is less than a maximum distance of walking sub-trips inputted by the user.

7. The method of claim 1 further comprising querying, by the one or more processors, a transportation database, wherein the transportation database comprises information pertaining to the at least one public transportation sub-trip and information pertaining to the private transportation sub-trip.

8. The method of claim 7, wherein the information pertaining to the at least one public transportation sub-trip comprises at least one of the public vehicle's id, arrival time of the public vehicle, departure time of the public vehicle, travel mode of the at least one public transportation sub-trip, ticket prices between different nodes, from a set of nodes, or path followed by the public vehicle.

9. The method of claim 7, wherein the information pertaining to the private transportation sub-trip comprises at least one of a private vehicle's id, contact details of a private vehicle's owner, available capacity in the private vehicle, path followed by the private vehicle, pick-up locations of the private vehicle, arrival time of the private vehicle, or departure time of the private vehicle.

10. The method of claim 7 further comprising updating, by the one or more processors, the transportation database, based on at least one of hyper text transfer protocol (HTTP), rich site summary (RSS) feed, or one or more application programming interfaces (APIs).

11. The method of claim 10, wherein the transportation database is updated through at least one of a public transportation system associated with the at least one public transportation sub-trip, a private transportation system associated with the private transportation sub-trip, a real time congestion monitoring system, or a carbon-footprint calculator.

12. The method of claim 1 further comprising presenting, by the one or more processors, the one or more ranked routes on a display device associated with the user.

13. The method of claim 12 further comprising receiving, by the one or more processors, a selection of a route, from the one or more presented routes, from the user.

14. The method of claim 13 further comprising updating, by the one or more processors, the one or more presented routes, based at least on real-time location of the user and congestion levels on the selected route.

15. The method of claim 13 further comprising detecting, by the one or more processors, a booking status for the private transportation sub-trip through a private transportation system associated with the private transportation sub-trip, based on the selection.

16. The method of claim 15 further comprising performing, by the one or more processors, at least one of:
   prompting the user to select an alternative route from the one or more presented routes based on the detection, or
   confirming the user about the booking status, based on the detection.

17. The method of claim 16, wherein the user is confirmed along with at least one of information pertaining to the at least one public transportation sub-trip or information pertaining to the private transportation sub-trip.

18. The method of claim 1, wherein the ridesharing constraints comprise at least a make of the private vehicle, a maximum occupancy level of the private vehicle, a maximum number of co-passengers in the private vehicle, and an acquaintance with the co-passengers.

19. The method of claim 1, wherein the tolerance constraints comprise at least a relevancy level of carbon-footprint on the trip, a relevancy level of cost for the trip, a relevancy level of duration of the trip, maximum number of hops in the trip, a maximum deviation from the originating node, a maximum deviation from the destination node, a maximum distance of walking sub-trips, a maximum deviation from shortest distance between the originating node and the destination node, a maximum waiting time in the trip, and a maximum deviation from the start time for the trip.

20. The method of claim 1, wherein the route constraints comprise at least inclusion of a node in the trip, exclusion of a node in the trip, inclusion of a route in the trip, exclusion of a route in the trip, travel mode of the trip, and a preferred time for the trip.

21. A method for determining one or more routes in a navigation system, the method comprising:
   receiving, by one or more processors, a request from a user comprising a first set of parameters corresponding to a trip, wherein the first set of parameters comprises at least one of an originating node for the trip, a destination node for the trip, a start time for the trip, or a set of preferences associated with the trip; and determining, by the one or more processors, the one or more routes between the originating node and the destination node, based on the first set of parameters, wherein each of the one or more routes comprises at least one public transportation sub-trip and a private transportation sub-trip, wherein the one or more routes are determined such that deviation of distance of the one or more routes from a shortest distance between the originating node and the destination node, is less than a maximum deviation as specified by the user, and wherein determining a route, from the one or more routes, comprises:

determining, by the one or more processors, a plurality of intermediate nodes between the originating node and the destination node, wherein the originating node, the destination node, and the plurality of intermediate nodes constitute a set of nodes, determining, by the one or more processors, the private transportation sub-trip between a first node, from the set of nodes, and a second node, from the set of nodes, wherein the second node has greater distance from the originating node than the first node, and wherein the private transportation sub-trip between the first node and the second node is traversed by the user on a private vehicle, and determining the at least one public transportation sub-trip comprising the first node and the second node, wherein the at least one public transportation sub-trip is traversed by the user on a public vehicle.

22. A system for determining one or more routes in a navigation system, the system comprising:

one or more processors operable to:

receive a request from a user comprising a first set of parameters corresponding to a trip, wherein the first set of parameters comprises at least one of an originating node for the trip, a destination node for the trip, a start time for the trip, or a set of preferences associated with the trip, and wherein the set of preferences comprises at least one of ridesharing constraints, tolerance constraints, and route constraints;

determine the one or more routes between the originating node and the destination node, based on the first set of parameters, wherein each of the one or more routes comprises at least one public transportation sub-trip traversed by the user on a public vehicle and a private transportation sub-trip traversed by the user on a private vehicle, wherein the one or more routes are determined such that deviation of distance of the one or more routes from a shortest distance between the originating node and the destination node, is less than a maximum deviation as specified by the user; and rank the one or more routes based on a trip score, associated with each of the one or more routes, determined based on the set of preferences.

23. A computer program product for use with a computer, the computer program product comprising a non-transitory computer readable medium, wherein the non-transitory computer readable medium stores a computer program code for determining one or more routes in a navigation system, wherein the computer program code is executable by one or more processors to:

receive a request from a user comprising a first set of parameters corresponding to a trip, wherein the first set of parameters comprises at least one of an originating node for the trip, a destination node for the trip, a start time for the trip, or a set of preferences associated with the trip, and wherein the set of preferences comprises at least one of ridesharing constraints, tolerance constraints, and route constraints;

determine the one or more routes between the originating node and the destination node, based on the first set of parameters, wherein each of the one or more routes comprises at least one public transportation sub-trip traversed by the user on a public vehicle and a private transportation sub-trip traversed by the user on a private vehicle, wherein the one or more routes are determined such that deviation of distance of the one or more routes from a shortest distance between the originating node and the destination node, is less than a maximum deviation as specified by the user; and rank the one or more routes based on a trip score, associated with each of the one or more routes, determined based on the set of preferences.

* * * * *